United States Patent [19]
Yamamoto

[11] Patent Number: 5,979,623
[45] Date of Patent: Nov. 9, 1999

[54] DYNAMIC DAMPER AND COUPLING MECHANISM

[75] Inventor: Kozo Yamamoto, Daito, Japan

[73] Assignee: Exedy Corporation, Osaka, Japan

[21] Appl. No.: 09/111,707

[22] Filed: Jul. 8, 1998

[30] Foreign Application Priority Data

Jul. 11, 1997 [JP] Japan .................................. 9-186753

[51] Int. Cl.[6] .................................................... F16D 3/14
[52] U.S. Cl. ................... 192/30 V; 192/48.1; 192/70.17
[58] Field of Search ............................. 192/30 V, 70.17, 192/209, 48.1; 74/574; 464/83, 180, 182

[56] References Cited

U.S. PATENT DOCUMENTS

| | | | |
|---|---|---|---|
| 1,723,886 | 8/1929 | Pfaff | 192/70.17 |
| 1,828,508 | 10/1931 | Murray | 192/53.36 |
| 2,958,526 | 11/1960 | Ulderup et al. | 267/63 |
| 3,209,875 | 10/1965 | Altmann | 192/66 |
| 4,157,227 | 6/1979 | Hahle | 403/228 |
| 4,828,090 | 5/1989 | Matsushita | 192/84 |
| 4,842,116 | 6/1989 | Fukushima | 74/574 X |
| 4,844,224 | 7/1989 | Fukushima | 192/70.17 |
| 4,846,323 | 7/1989 | Fukushima | 192/30 |
| 5,135,089 | 8/1992 | Kovac | 192/70.17 |
| 5,152,510 | 10/1992 | Komabashiri | 267/141.2 |
| 5,168,971 | 12/1992 | Kovac | 192/30 V |
| 5,190,269 | 3/1993 | Ikeda et al. | 267/140.12 |
| 5,253,740 | 10/1993 | Kohno et al. | 192/70.16 |
| 5,499,703 | 3/1996 | Kii et al. | 192/30 V X |
| 5,511,446 | 4/1996 | Kajitani et al. | 74/573 F |
| 5,669,820 | 9/1997 | Fukushima | 464/98 |
| 5,692,591 | 12/1997 | Kimura | 192/84.941 |
| 5,797,297 | 8/1998 | Mokdad | 74/574 |

FOREIGN PATENT DOCUMENTS 648031  6/1994  Japan .

*Primary Examiner*—Charles A Marmor
*Assistant Examiner*—Saul Rodriguez
*Attorney, Agent, or Firm*—Shinjyu Global IP Counselors, LLP

[57] ABSTRACT

A dynamic damper 70 allows for a stable operation of a sub-clutch without complicating a structure of the sub-clutch. The dynamic damper 70 of a coupling mechanism 91 for coupling a crankshaft 90 of an engine and an input shaft 9 of a transmission includes a mass member 71, a sub-clutch 73 and an annular rubber member 72. The mass member 71 can rotate in accordance with rotation of the input shaft 9. The sub-clutch 73 has a release member 86 for release, and releases interlocking between the input shaft 9 and the mass member 71 when the crankshaft 90 and the input shaft 9 are released from each other by releasing the biasing state of a pressure plate 4c. The release member 86 is in contact with the pressure plate 4c and moves in accordance with an axial movement of the pressure plate 4c. The annular rubber member 72 elastically couples the input shaft 9 and the mass member 71 in the rotating direction when they are in the interlocked state.

20 Claims, 3 Drawing Sheets

DYNAMIC DAMPER AND COUPLING MECHANISM

BACKGROUND OF THE INVENTION

1. Field of the Invention

The present invention generally relates to a dynamic damper and a coupling mechanism. In particular, the present invention relates to a dynamic damper which is coupled to an input shaft of a transmission to rotate therewith for dampening vibrations in the coupling mechanism.

2. Background Information

In connection with such a dynamic damper and a coupling mechanism, the assignee has already developed prior arts disclosed in Japanese Laid-Open Patent Publication No. 6-48031 (1994) as well as other similar dynamic dampers and coupling mechanisms.

In the above-mentioned prior arts, a second flywheel forming a mass portion is coupled to a drive and transmission system through a torsional damper mechanism to dampen a torsional vibration on the drive and transmission system only when a clutch disk is pressed against a first flywheel. Thereby, an operation impeding shifting of the transmission is suppressed in a disengaged state of a clutch while suppressing gear noises (neutral noises) of the transmission in a neutral state as well as vibrations and noises of the transmission during driving of a vehicle.

In the above prior arts, a frictional dampening mechanism (sub-clutch) is employed for coupling the second flywheel to the drive and transmission system. The sub-clutch is operated to engage by utilizing an axial movement of the clutch disk which occurs when the clutch disk is pressed against the first flywheel. More specifically, a motion of a spline hub which occurs in accordance with the movement of the clutch disk is utilized to engage frictionally the sub-clutch.

However, the distance of axial movement of the clutch disk is very short. Further, due to deflection of a plate and others which couple the clutch disk to the spline hub, the distance of axial movement of the spline hub is shorter than the distance of axial movement of the clutch disk. Therefore, a member for engaging and disengaging the sub-clutch moves only a small distance. Accordingly, the sub-clutch may operate unstably. For avoiding this unstable operation, the sub-clutch may be adapted to require only a small movement for stable operation. However, this may complicate the structure of the sub-clutch.

In view of the above, there exists a need for a dynamic damper and a coupling mechanism which overcomes these problems in the prior art. This invention addresses these needs in the prior art as well as other needs, which will become apparent to those skilled in the art from this disclosure.

SUMMARY OF THE INVENTION

An object of the invention is to provide a dynamic damper, which allows a more stable operation of the sub-clutch without complicating the structure of the sub-clutch.

According to a first aspect of the present invention, a dynamic damper is attached to a coupling mechanism, which has a mass portion, a sub-clutch and an elastic portion. The coupling mechanism is a mechanism for coupling a crankshaft of an engine to an input shaft of a transmission. The coupling mechanism includes a flywheel assembly, a clutch disk assembly and a clutch cover assembly. The flywheel assembly has a flywheel, which is non-rotatably coupled to the crankshaft of the engine. The clutch disk assembly is coupled to the input shaft of the transmission. The clutch cover assembly has an axially movable pressure plate. The clutch cover assembly biases the pressure plate toward the flywheel to hold the clutch disk assembly between the flywheel and the pressure plate for frictional engagement between the flywheel assembly and the clutch disk assembly.

The mass portion can rotate in accordance with rotation of the input shaft of the transmission. The sub-clutch releases interlocking between the input shaft of the transmission and the mass portion when biasing by the pressure plate is released and thereby the coupling between the crankshaft of the engine and the input shaft of the transmission is released. The sub-clutch has a release member. The release member is in contact with the pressure plate, and moves in accordance with an axial movement of the pressure plate. The elastic portion elastically couples the input shaft of the transmission and the mass portion together in a rotating direction when the sub-clutch operates the input shaft of the transmission and the mass portion in an interlocked manner.

In the coupling mechanism provided with the above-mentioned dynamic damper mechanism, a torque supplied from the crankshaft of the engine is transmitted through the flywheel assembly and the clutch cover assembly to the clutch disk assembly, and then the torque is transmitted therefrom to the input shaft of the transmission. When the clutch disk assembly is held between the flywheel and the pressure plate, i.e., when the coupling mechanism is in the coupling state, the sub-clutch acts to operate the dynamic damper in accordance with the rotation of the input shaft of the transmission. Therefore, the dynamic damper dampens neutral noises in the neutral state of the transmission as well as noises thereof during driving. The above structure does not employ an inertia damper, which avoids a resonance by mere addition of an inertia, but employs the dynamic damper. Therefore, it is possible to dampen the vibration of the input shaft of the transmission in a partial rotation range. Consequently, the vibration can be reduced to a level, which cannot be attained by the internal damper.

For releasing the operation of the dynamic damper, the sub-clutch is provided with the release member, which operates in accordance with the movement of the pressure plate. Since the release member is in contact with the pressure plate, it can axially move a distance substantially equal to a distance of the axial movement of the pressure plate. The distance of movement of the pressure plate is larger than a distance of movement of a clutch disk assembly, which is designed to move a member provided for releasing a sub-clutch in the prior art. Therefore, engagement and disengagement of the sub-clutch can be performed more stably than the prior art.

According to the dynamic damper of this aspect of the present invention, the member for operating the sub-clutch can axially move a longer distance than the prior art. Therefore, it is not necessary to complicate the structure compared with the prior art, and the operation of the sub-clutch can be stable.

According to a second aspect of the present invention, the dynamic damper according to the first aspect further has such a feature that the flywheel is provided with at least one axially extending through hole. The release member extends through the through hole or holes in the flywheel. The dynamic damper is opposed to the pressure plate with the flywheel therebetween.

In this aspect, the flywheel is present axially between the pressure plate and the dynamic damper, but the flywheel is provided with one or more holes through which the release member of the sub-clutch extends. Therefore, the axial movement of the pressure plate can be utilized for engaging and disengaging the sub-clutch.

According to a third aspect of the present invention, a coupling mechanism for coupling a crankshaft of an engine and an input shaft of a transmission includes a flywheel assembly, a clutch disk assembly, a clutch cover assembly and a dynamic damper. The flywheel assembly is non-rotatably coupled to the crankshaft of the engine, and has a flywheel. The clutch disk assembly is coupled to the input shaft of the transmission. The clutch cover assembly has an axially movable pressure plate. The clutch cover assembly biases the pressure plate toward the flywheel to hold the clutch disk assembly between the flywheel and the pressure plate for frictional engagement between the flywheel assembly and the clutch disk assembly. The dynamic damper is the same as that according to the first or second aspect of the present invention.

Other objects, advantages and salient features of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

Figure 1:
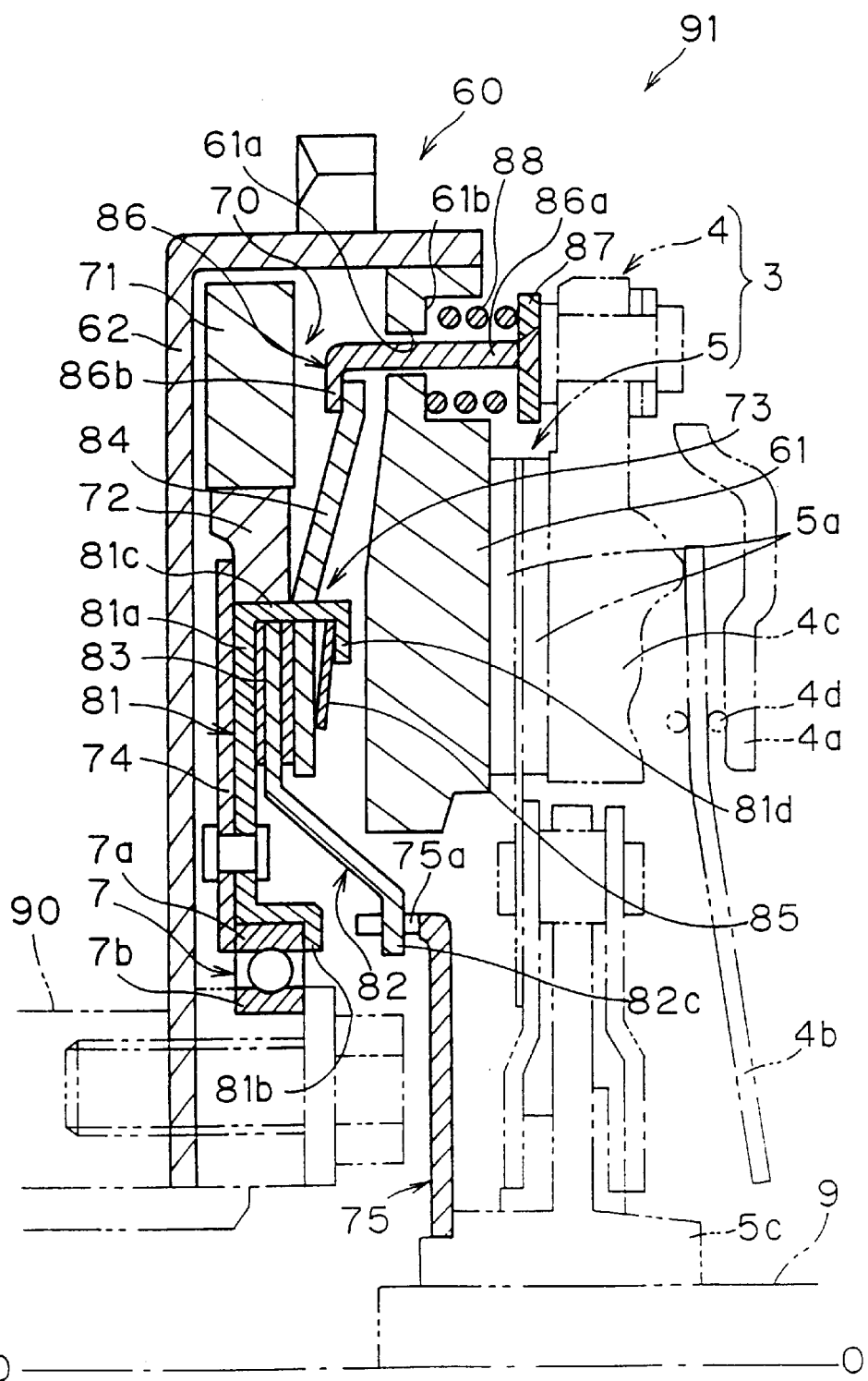
FIG. 1 is a partial cross-sectional view of a flywheel assembly including a dynamic damper employed in a coupling mechanism in accordance with one embodiment of the present invention.

Referring initially to FIG. 1, a partial cross-sectional view of a coupling mechanism 91 is illustrated in accordance with one embodiment of the present invention. The coupling mechanism 1 is basically formed of a flywheel assembly 60 including a dynamic damper 70 and a main clutch 3. The main clutch 3 includes a clutch cover assembly 4 and a clutch disk assembly 5. The coupling mechanism 1 has a rotation axis represented by line O—O of FIG. 1.

The dynamic damper 70 releasably couples a crankshaft 90 of an engine to an input shaft 9 of a transmission, and operates to dampen a vibration of the transmission when coupled to the input shaft 9 of the transmission by a sub-clutch 73.

The flywheel assembly 60 is non-rotatably coupled to the crankshaft 90 of the engine. The flywheel assembly 60 is basically formed of a flywheel 61, a housing member 62 and the dynamic damper 70. The flywheel 61 and the housing member 62 are coupled together at their outer peripheries. The outer peripheral portion of the flywheel 61 is provided with a plurality of recesses or concavities 61b, which are located on a transmission side (right side as viewed in FIG. 1). The outer peripheral portion of the flywheel 61 is also provided with a plurality of holes 61a which extend axially through the flywheel 61 from centers of bottom surfaces of the concavities 61 b (i.e., surfaces defining the left ends of the concavities near the engine), respectively. The radially inner portion of the housing member 62 is fixedly coupled to the crankshaft 90 of the engine by a plurality of circumferentially equally spaced bolts. The dynamic damper 70 will be described later in more detail.

The clutch cover assembly 4 of the main clutch 3 is basically formed of a clutch cover 4a, an annular diaphragm spring 4b and a pressure plate 4c. The clutch cover assembly 4 of the main clutch 3 is normally biased toward the engine (i.e., to the left as viewed in FIG. 13) by the diaphragm spring 4b. The clutch cover 4a is fixed at its outer peripheral portion to an end of the flywheel 61 near the transmission (i.e., right end as viewed in FIG. 13). The inner peripheral portion of the clutch cover 4a carries a radially middle portion of the diaphragm spring 4b via wire rings 4d in a conventional manner. The pressure plate 4c is held within the clutch cover 4a by the outer peripheral portion of the diaphragm spring 4b as well as by conventional parts, which are well known in the art. When a release bearing (not shown) moves the inner periphery of the diaphragm spring 4b along the rotation axis O—O, the pressure plate 4c moves axially for biasing the pressure plate 4c by the diaphragm spring 4b and/or releasing the diaphragm spring 4b from the same. The clutch cover assembly 4 operates to bias the pressure plate 4c toward the flywheel 61, and thereby operates to hold the clutch disk assembly 5 between the flywheel 61 and the pressure plate 4c for frictionally engaging the flywheel assembly 4 and the clutch disk assembly 5 together.

The clutch disk assembly 5 of the main clutch 3 is basically formed of a frictional engagement portion having friction facings 5a, a splined hub 5c and coil springs (not shown). The splined hub 5c has a splined inner bore that engages the splines of the input shaft 9 of the transmission. The coil springs (not shown) elastically couple the frictional engagement portion and the spline hub 5c together in the rotating direction.

Figure 2:
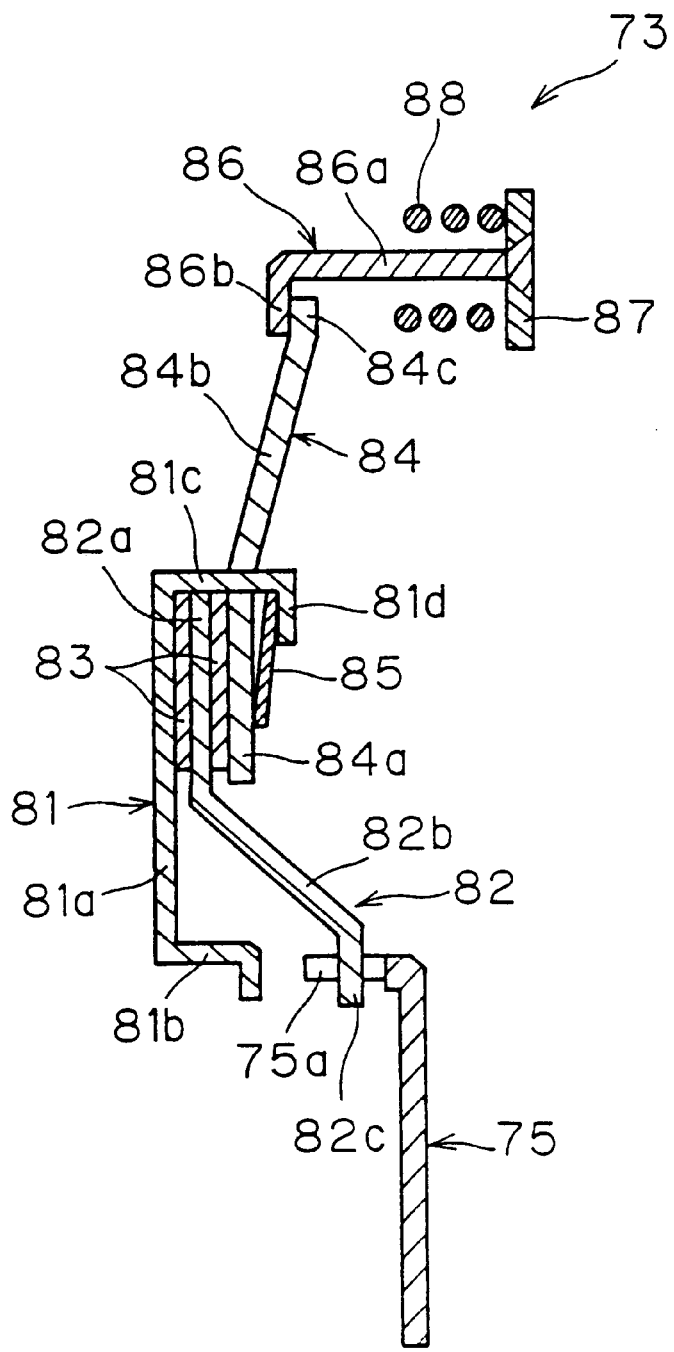
FIG. 2 is a partial cross-sectional view of the sub-clutch of the flywheel assembly illustrated in FIG. 1 in accordance with one embodiment of the present invention.
Figure 3:
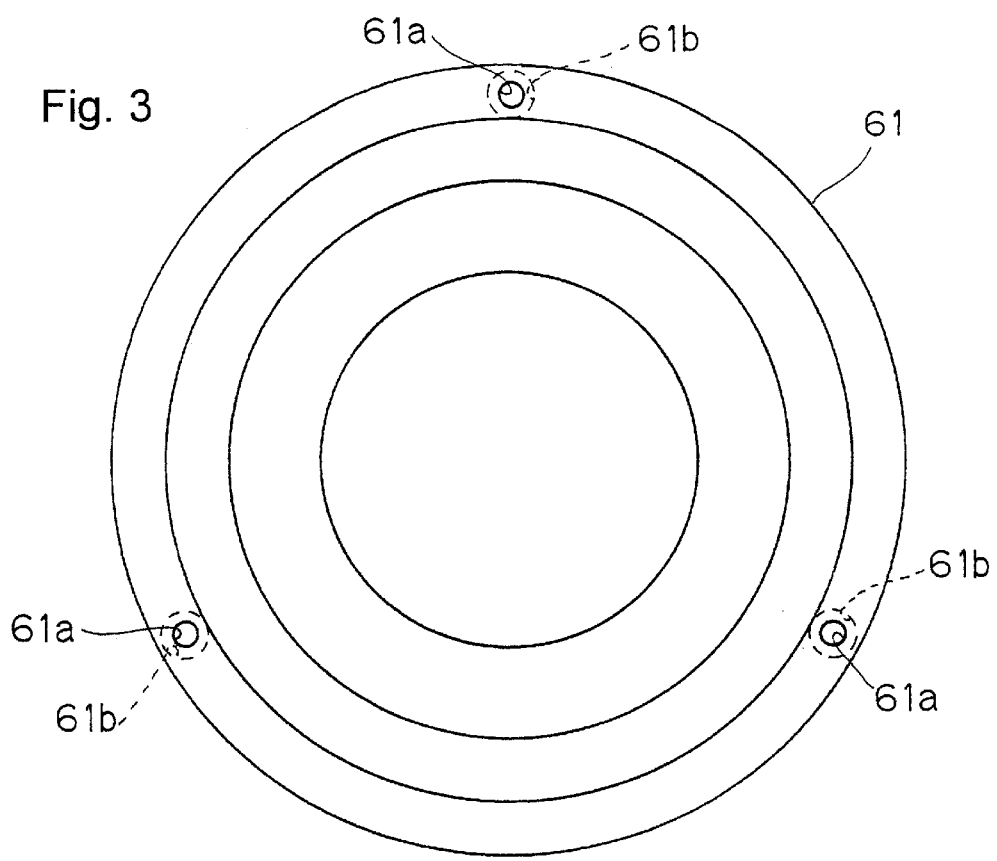
FIG. 3 is a left side elevational view of the flywheel illustrated in FIG. 1.

Referring now to FIG. 2, the structure of the dynamic damper 70 will now be described below in more detail. The dynamic damper 70 is basically formed of an annular mass member or portion 71, an annular rubber member 72, a circular support plate 74, a sub-clutch 81, the sub-clutch 73 and a circular plate 75.

The input portion of the dynamic damper 70 is formed of the circular or annular support plate 74 and the sub-clutch housing 81, which are fixed together by rivets as shown in FIG. 13. The annular rubber member 72 elastically couples the mass member 71 to the input portion in circumferential, axial and radial directions. The sub-clutch housing 81 is formed of a circular plate portion 81a, a fixing portion 81b, a cylindrical portion 81c, and an axial restriction portion 81d. The fixing portion 81b extends axially from the inner periphery of the circular portion 81a toward the transmission and then further extends radially inward toward the axis O—O. The cylindrical portion 81c extends axially from the outer periphery of the circular plate portion 81a toward the transmission. The axial restriction portion 81d extends radially inward from the end of the cylindrical portion 81a near the transmission. The cylindrical portion 81c is provided with a plurality of circumferentially spaced openings.

The inner peripheral portion of the input portion of the dynamic damper 70 is fixedly coupled to an outer race 7a of a ball bearing 7. Specifically, the inner peripheral portion of the circular support plate 74 and the fixing portion 81b of the sub-clutch housing 81 secure the input portion to an outer race 7a of a ball bearing 7. An inner race 7b of the ball bearing 7 is fixedly coupled to the crankshaft 90 of the engine so that the input portion is supported rotatably on the crankshaft 90 of the engine but unmovably on the crankshaft 90 of the engine in the axial and radial directions.

The input portion is adhered at its outer peripheral portion to the inner peripheral surface of the annular rubber member 72. More specifically, the inner peripheral surface of the annular rubber member 72 is fixedly coupled to the outer peripheral portion of the circular support plate 74 and the outer peripheral surface of the cylindrical portion 81c of the sub-clutch housing 81.

The sub-clutch 73 is a clutch mechanism of a frictional engagement type for engaging and disengaging the foregoing three components, i.e., the mass member 71, annular rubber member 72 and input portion of the dynamic damper 70 with and from the input shaft 9 of the transmission. The sub-clutch 73 is basically formed of the sub-clutch housing 81 (discussed above), a friction plate 82, a release coupling member 84, a conical spring 85, one or more release members 86 with circular seats 87 attached thereto and one or more coil springs 88.

Turning now to FIG. 2 in particular, the friction plate 82 is formed of an outer peripheral portion 82a with a pair of annular friction members 83 located on its axially opposite surfaces, respectively, an inner peripheral portion 82b and a plurality of claws 82c. The inner peripheral portion 82b extends radially inward and obliquely from the inner periphery of the outer peripheral portion 82a toward the transmission. The claws 82c project radially inward from the inner periphery of the inner peripheral portion 82b.

The coupling member 84 is formed of a radially inner circular plate portion 84, a plurality of intermediate levers 84b and radially outer lever portions 84c. The intermediate levers 84b extend radially outward and obliquely from the radially inner circular plate portion 84a toward the transmission. The radially outer lever portions 84c extend radially outward from the radially outer ends of the intermediate levers 84b, respectively. The radially inner circular plate portion 84a has radially inner portions, which extend through openings formed at the cylindrical portion 81c, and therefore is axially movable.

The conical spring 85 has an outer periphery, of which movement toward the transmission is restricted by the axial restriction portion 81d of the sub-clutch housing 81. The inner periphery of conical spring 85 biases the outer peripheral portion 82a of the friction plate 82 toward the input portion (i.e., circular plate portion 81a of the sub-clutch housing 81) via the radially inner circular plate portion 84a of the release coupling member 84.

Figure 4:
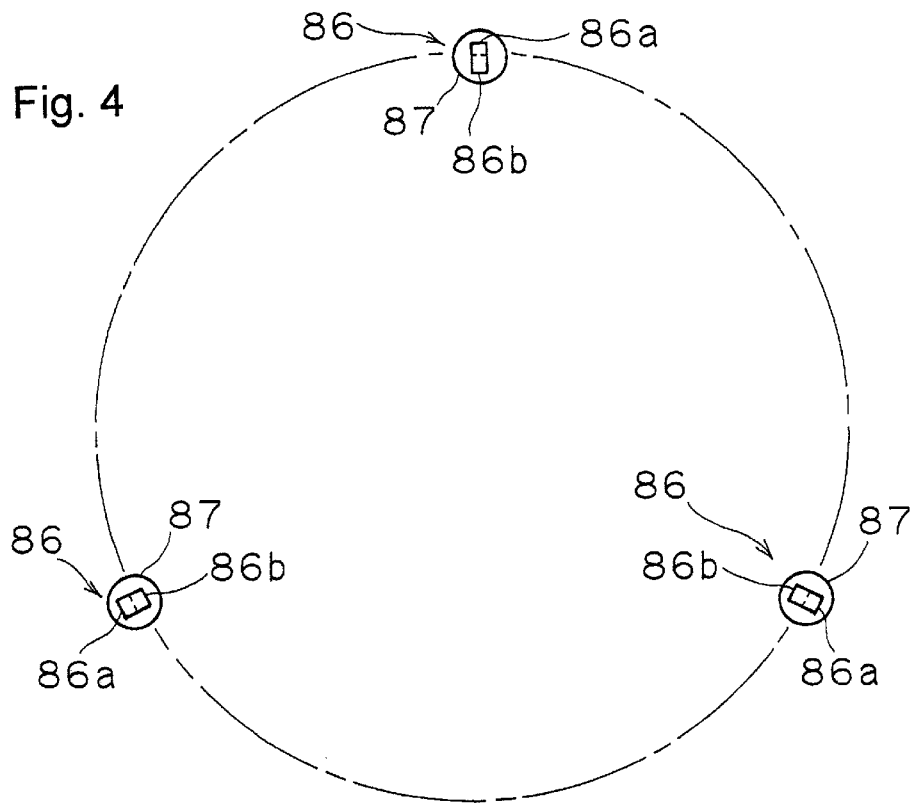
FIG. 4 is a left side elevational view of the three release members arranged in a circular pattern for use in the flywheel assembly illustrated in FIGS. 1 and 2.

As seen in FIGS. 1 and 4, the release members 86 are each formed of a connecting portion 86a and an engagement portion 86b extending radially inward from the end of the connecting portion 86a near the engine. While three release members 86 are illustrated, it will be apparent to those skilled in the art that the number of release members is a matter of design choice. Thus, fewer or more release members can be used as needed and/or desired. The release members 86 extend through the holes 61a in the flywheel 61 as seen in FIG. 1. As seen in FIG. 4, the release members 86 are substantially L-shaped members or hooks, which are circumferentially spaced apart from each other. The ends of the posts forming the connecting portions 86a near the transmission are fixedly coupled to the circular seats 87 by caulking or other means for preventing separation from the same. The surfaces of the engagement portions 86b opposed to the transmission contact the lever outer peripheral portion 84c of the coupling member 84. More specifically, the engagement portions 86b are in contact with the surface of the lever outer peripheral portion 84c, which is opposed to the engine.

Each coil spring 88 is arranged within one of the concavities 61b in the flywheel 61 for continuously pressing the circular seats 87 against the pressure plate 4c. Thereby, the circular seats 87 and the release members 86 follow the axial movement of the pressure plate 4c.

The circular plate 75 couples the input shaft 9 of the transmission and the friction plate 82 of the sub-clutch 73. The inner periphery of the circular plate 75 is fixed to the spline hub 5c, which in turn is fixed to the input shaft 9. The circular plate 75 has a plurality of claws 75a, which extend from the outer periphery thereof toward the engine (i.e., to the left as viewed in FIG. 1). The claws 75a are circumferentially engaged with claws 82c of the friction plate 82. Therefore, the friction plate 82 is non-rotatably coupled to the circular plate 75, but is axially movable with respect to the circular plate 75.

Description will now be given on operations of the coupling mechanism 91 and the dynamic damper 70. The rotation of the crankshaft 90 of the engine is transmitted to the input shaft 9 of the transmission through the flywheel assembly 60 and the main clutch 3. When the main clutch 3 is in the engaged position as shown in FIG. 1, the pressure plate 4c is biased toward the flywheel 61 by the biasing force of the diaphragm spring 4b so that the clutch disk assembly 5 is held between the flywheel 61 and the pressure plate 4c. Thereby, the crankshaft 90 of the engine is coupled to the input shaft 9 of the transmission. In this state, as shown in FIG. 1, the friction plate 82 is biased by the conical spring 85 toward the engine so that the sub-clutch housing 81 and the friction plate 82 are frictionally engaged. Therefore, the input shaft 9 of the transmission is coupled to the mass member 71 of the dynamic damper 70, annular rubber member 72 and input portion through the circular plate 75 and the friction plate 82.

When the dynamic damper 70 is coupled to the input shaft 9 of the transmission, the dynamic damper 70 dampens neutral noises during the neutral state of the transmission and dampens driving noises during the driving state of the transmission. Particularly, the vibrations of the transmission in a partial rotation range are actively dampened by the dynamic damper 70.

When the main clutch 3 is released and the pressure plate 4c moves toward the transmission, the release members 86 move toward the transmission together with the pressure plate 4c. Thereby, the coupling member 84 moves toward the transmission against the elastic force of the conical spring 85 to decrease the torque transmission capacity achieved by the frictional engagement between the friction plate 82 and the sub-clutch housing 81. Thus, even when the main clutch 3 is in the disengaged state, the sub-clutch 73 is disengaged only incompletely so that the mass member 71, annular rubber member 72 and the input portion of the dynamic damper 70 rotate at a speed close to the rotation speed of the input shaft 9 of the transmission.

The advantages which can be achieved by employment of the structure of this embodiment will now be described in more detail. First, the mass member 71 is radially and axially carried at its radially inner side. Thus, the mass member 71 is coupled to the input portion connected to the input shaft 9 of the transmission by the annular rubber member 72. This arrangement results in the annular rubber member 72 concentratedly functioning to hold and position the input portion of the mass member 71 in the circumferential, radial and axial directions. Therefore, it is not necessary to arrange an independent support mechanism or the like, for example, radially outside the mass member 71, which allows increase in mass of the mass member 71, and therefore, it is possible to increase a range in which damper characteristics can be set. The annular rubber member 72 may have an anisotropy, which allows satisfactory setting of elastic characteristics in the rotating direction of the annular rubber 72 corresponding to the damper characteristics as well as elastic characteristics in the radial direction of the annular rubber member 72 required for supporting the mass member 71 without causing disadvantages such as interference with another member.

Secondly, the dynamic damper 70 employs the annular rubber member 72. This results in the annular rubber member 72 having an elasticity not only in the rotating direction but also in the axial direction. Therefore, the annular rubber member 72 can operate as the dynamic damper also with respect to the axial vibration for dampening the axial vibration.

Thirdly, even when the main clutch 3 is in the disengaged state, the sub-clutch 73 is not completely disengaged. In particular, the dynamic damper 70 rotates at a speed close to the rotation speed of the input shaft 9 of the transmission. This reduces a difference which occurs in rotation speed between the dynamic damper 70 and the input shaft 9 of the transmission during the engaging operation of the main clutch 3. Therefore, a rotational force acting on the friction members 83 of the friction plate 82 also decreases. Accordingly, conditions for selecting the material of the friction member 83 is relaxed so that the cost of the friction member 83 can be lower than in the prior art.

However, it is desired to reduce an inertia of the input shaft 9 of the transmission for smoothening the shifting operation of the transmission which is performed together with the disengaging operation of the main clutch 3. Therefore, it is required to reduce a torque, which is transmitted between the input portion of the dynamic damper 10 and the input shaft 9 of the transmission while the main clutch 3 is disengaged. The above requirement runs counter to the mechanism in which the sub-clutch 73 is not completely disengaged even when the main clutch 3 is disengaged. Therefore, both of these requirement and fact are taken into consideration when determining and setting the torque which is transmitted by the sub-clutch 73 between the input shaft 9 of the transmission and the input portion of the dynamic damper 10 when the main clutch 3 is disengaged.

Fourthly, the coupling mechanism 91 employs the release members 86, which moves in accordance with a movement of the pressure plate 4c, for releasing the operation of the sub-clutch 73 in the interlocked manner. The axial distance of movement of the pressure plate 4c is larger than the distance of movement of the clutch disk assembly 5. Therefore, engaging and disengaging of the sub-clutch 73 can be performed stably compared with the structure wherein the sub-clutch is operated by utilizing the axial movement of the clutch disk assembly 5.

According to the invention, the release member, which operates in accordance with movement of the pressure plate, is employed for releasing the interlocked operation of the dynamic damper. Therefore, the sub-clutch can be engaged and disengaged more stably than the conventional structure employing a member which operates in the interlocked manner, i.e., in accordance with the movement of the clutch disk assembly.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A dynamic damper assembly adapted to be attached to a coupling mechanism for coupling a crankshaft of an engine and an input shaft of a transmission together, the coupling mechanism including a flywheel assembly having a flywheel non-rotatably coupled to the crankshaft of the engine, a clutch disk assembly coupled to the input shaft of the transmission, and a clutch cover assembly having an axially movable pressure plate adapted to bias the pressure plate toward the flywheel to hold the clutch disk assembly between the flywheel and the pressure plate for frictional engagement between the flywheel assembly and the clutch disk assembly, and said dynamic damper assembly comprising:

a mass portion adapted to rotate with the input shaft of the transmission;

a sub-clutch having a first part coupled to said mass portion, a second part adapted to be non-rotatably coupled to the input shaft of the transmission and a release member arranged to contact the pressure plate and move in response to axial movement of the pressure plate, said release member of said sub-clutch being operable to at least partially disengage said second part which is adapted to be coupled to the input shaft of the transmission from said first part which is coupled to said mass portion when biasing by said pressure plate disengages the flywheel to release the crankshaft of the engine from the input shaft of the transmission; and an elastic portion operatively coupled to said mass portion and adapted to elastically couple the input shaft of the transmission and said mass portion together in a rotating direction when said sub-clutch operates the input shaft of the transmission and said mass portion in an interlocked manner, said release member being adapted to extend through an axial through hole formed in the flywheel, and said dynamic damper being configured to be opposed to the pressure plate with the flywheel located therebetween.

2. A dynamic damper assembly adapted to be attached to a coupling mechanism for coupling a crankshaft of an engine and an input shaft of a transmission together, the coupling mechanism including a flywheel assembly having a flywheel non-rotatably coupled to the crankshaft of the engine, a clutch disk assembly coupled to the input shaft of the transmission, and a clutch cover assembly having an axially movable pressure plate adapted to bias the pressure plate toward the flywheel to hold the clutch disk assembly between the flywheel and the pressure plate for frictional engagement between the flywheel assembly and the clutch disk assembly, and said dynamic damper assembly comprising:

a mass portion adapted to rotate with the input shaft of the transmission;

a sub-clutch having a first part coupled to said mass portion, a second part adapted to be non-rotatably coupled to the input shaft of the transmission and a plurality of release members arranged to contact the pressure plate and move in response to axial movement of the pressure plate, with each of said release members including an engagement portion, a connecting portion adapted to extend through a hole formed in the flywheel, and a seat portion adapted to engage the pressure plate, said release members of said sub-clutch being operable to at least partially disengage said second part which is adapted to be coupled to the input shaft of the transmission from said first part which is coupled to said mass portion when biasing by the pressure plate disengages the flywheel to release the crankshaft of the engine from the input shaft of the transmission; and an elastic portion operatively coupled to said mass portion and adapted to elastically couple the input shaft of the transmission and said mass portion together in a rotating direction when said sub-clutch operates the input shaft of the transmission and said mass portion in an interlocked manner.

3. The dynamic damper assembly according to claim 2, wherein said sub-clutch further includes a coupling member movably coupled to said engagement portions from an engaged position to a disengaged position.

4. The dynamic damper assembly according to claim 3, wherein said first part of said sub-clutch includes a sub-clutch housing and said second part of said sub-clutch includes a friction plate biased by a biasing member to be operatively coupled with a portion of said sub-clutch housing by a biasing member.

5. The dynamic damper assembly according to claim 4, wherein said coupling member is disposed between said friction plate and said biasing member.

6. The dynamic damper assembly according to claim 5, wherein said friction plate having an inner attachment portion configured to be non-rotatably coupled to the input shaft of the transmission, but axially movable relative to the input shaft of the transmission.

7. The dynamic damper assembly according to claim 6, wherein said mass portion and said first part of said sub-clutch are coupled to a bearing which is adapted to be coupled to the crankshaft of the engine to rotatably support said mass portion and said first part of sub-clutch on the crankshaft of the engine.

8. A dynamic damper assembly adapted to be attached to a coupling mechanism for coupling a crankshaft of an engine and an input shaft of a transmission together, the coupling mechanism including a flywheel assembly having a flywheel non-rotatably coupled to the crankshaft of the engine, a clutch disk assembly coupled to the input shaft of the transmission, and a clutch cover assembly having an axially movable pressure plate adapted to bias the pressure plate toward the flywheel to hold the clutch disk assembly between the flywheel and the pressure plate for frictional engagement between the flywheel assembly and the clutch disk assembly, and said dynamic damper assembly comprising:

a mass portion adapted to rotate with the input shaft of the transmission;

a sub-clutch having a first part coupled to said mass portion, a second part adapted to be non-rotatably coupled to the input shaft of the transmission and a release member arranged to contact the pressure plate and move in response to axial movement of the pressure plate, said release member of said sub-clutch being operable to at least partially disengage said second part which is adapted to be coupled to the input shaft of the transmission from said first part which is coupled to said mass portion when biasing by said pressure plate disengages the flywheel to release the crankshaft of the engine from the input shaft of the transmission; and an elastic portion operatively coupled to said mass portion and adapted to elastically couple the input shaft of the transmission and said mass portion together in a rotating direction when said sub-clutch operates the input shaft of the transmission and said mass portion in an interlocked manner, said mass portion and said first part of said sub-clutch being coupled to a bearing which is adapted to be coupled to the crankshaft of the engine to rotatably support said mass portion and said first part of said sub-clutch on the crankshaft of the engine.

9. A dynamic damper assembly adapted to be attached to a coupling mechanism for coupling a crankshaft of an engine and an input shaft of a transmission together, the coupling mechanism including a flywheel assembly having a flywheel non-rotatably coupled to the crankshaft of the engine, a clutch disk assembly coupled to the input shaft of the transmission, and a clutch cover assembly having an axially movable pressure plate adapted to bias the pressure plate toward the flywheel to hold the clutch disk assembly between the flywheel and the pressure plate for frictional engagement between the flywheel assembly and the clutch disk assembly, and said dynamic damper assembly comprising:

a mass portion adapted to rotate with the input shaft of the transmission;

a sub-clutch having a first part coupled to said mass portion, a second part adapted to be non-rotatably coupled to the input shaft of the transmission and a release member arranged to contact the pressure plate and move in response to axial movement of the pressure plate, said release member of said sub-clutch being operable to at least partially disengage said second part which is adapted to be coupled to the input shaft of the transmission from said first part which is coupled to said mass portion when biasing by said pressure plate disengages the flywheel to release the crankshaft of the engine from the input shaft of the transmission; and an elastic portion operatively coupled to said mass portion and adapted to elastically couple the input shaft of the transmission and said mass portion together in a rotating direction when said sub-clutch operates the input shaft of the transmission and said mass portion in an interlocked manner, said sub-clutch further including a coupling member disposed between said first part and said second part, said coupling member is coupled to said release member to move therewith.

10. The dynamic damper assembly according to claim 9, wherein said first part of said sub-clutch includes a sub-clutch housing and said second part of said sub-clutch includes a friction plate biased by a biasing member to be operatively coupled with a portion of said sub-clutch housing by a biasing member.

11. A coupling mechanism adapted to be coupled between a crankshaft of an engine and an input shaft of a transmission, comprising:

a flywheel assembly having a flywheel non-rotatably coupled to the crankshaft of the engine;

a clutch disk assembly adapted to be coupled to the input shaft of the transmission;

a clutch cover assembly having an axially movable pressure plate and being operable to bias said pressure plate toward said flywheel to hold said clutch disk assembly between said flywheel and said pressure plate for frictional engagement between said flywheel assembly and said clutch disk assembly; and a dynamic damper assembly adapted to be coupled to the input shaft of the transmission, said dynamic damper including a mass portion adapted to rotate with the input shaft of the transmission;

a sub-clutch having a first part coupled to said mass portion, a second part adapted to be non-rotatably coupled to the input shaft of the transmission and a release member arranged to contact said pressure plate and move in response to axial movement of said pressure plate, said release member of said sub-clutch being operable to at least partially disengage said second part which is adapted to be coupled to the input shaft of the transmission from said first part which is coupled to said mass portion when biasing by said pressure plate disengages said flywheel to release the crankshaft of the engine from the input shaft of the transmission; and an elastic portion operatively coupled to said mass portion and adapted to elastically couple the input shaft of the transmission and said mass portion together in a rotating direction when said sub-clutch operates the input shaft of the transmission and said mass portion in an interlocked manner, said release member extending through an axial through hole formed in said flywheel, and said dynamic damper being opposed to said pressure plate with said flywheel located therebetween.

12. A coupling mechanism adapted to be coupled between a crankshaft of an engine and an input shaft of a transmission, comprising:

a flywheel assembly having a flywheel adapted to be non-rotatably coupled to the crankshaft of the engine;

a clutch disk assembly adapted to be coupled to the input shaft of the transmission;

a clutch cover assembly having an axially movable pressure plate and being operable to bias said pressure plate toward said flywheel to hold said clutch disk assembly between said flywheel and said pressure plate for frictional engagement between said flywheel assembly and said clutch disk assembly; and a dynamic damper assembly adapted to be coupled to the input shaft of the transmission, said dynamic damper including a mass portion adapted to rotate with the input shaft of the transmission;

a sub-clutch having a first part coupled to said mass portion, a second part adapted to be non-rotatably coupled to the input shaft of the transmission and a plurality of release members arranged to contact said pressure plate and move in response to axial movement of said pressure plate, with each of said release members including an engagement portion, a connecting portion extending through a hole formed in said flywheel, and a seat portion for engaging said pressure plate, said release members of said sub-clutch being operable to at least partially disengage said second part which is adapted to be coupled to the input shaft of the transmission from said first part which is coupled to said mass portion when biasing by said pressure plate disengages said flywheel to release the crankshaft of the engine from the input shaft of the transmission; and an elastic portion operatively coupled to said mass portion and adapted to elastically couple the input shaft of the transmission and said mass portion together in a rotating direction when said sub-clutch operates the input shaft of the transmission and said mass portion in an interlocked manner.

13. The coupling mechanism according to claim 12, wherein said sub-clutch further includes a coupling member movably coupled to said engagement portions from an engaged position to a disengaged position.

14. The coupling mechanism according to claim 13, wherein said first part of said sub-clutch includes a sub-clutch housing and said second part of said sub-clutch includes a friction plate biased by a biasing member to be operatively coupled with a portion of said sub-clutch housing by a biasing member.

15. The coupling mechanism according to claim 14, wherein said coupling member is disposed between said friction plate and said biasing member.

16. The coupling mechanism according to claim 15, wherein said friction plate having an inner attachment portion configured to be non-rotatably coupled to the input shaft of the transmission, but axially movable relative to the input shaft of the transmission.

17. The coupling mechanism according to claim 16, wherein said mass portion and said first part of said sub-clutch are coupled to a bearing which is adapted to be coupled to the crankshaft of the engine to rotatably support said mass portion and said first part of sub-clutch on the crankshaft of the engine.

18. A coupling mechanism adapted to be coupled between a crankshaft of an engine and an input shaft of a transmission, comprising:

a flywheel assembly having a flywheel non-rotatably coupled to the crankshaft of the engine;

a clutch disk assembly adapted to be coupled to the input shaft of the transmission;

a clutch cover assembly having an axially movable pressure plate and being operable to bias said pressure plate toward said flywheel to hold said clutch disk assembly between said flywheel and said pressure plate for functional engagement between said flywheel assembly and said clutch disk assembly; and a dynamic damper assembly adapted to be coupled to the input shaft of the transmission; said dynamic damper including a mass portion adapted to rotate with the input shaft of the transmission;

a sub-clutch having a first part coupled to said mass portion, a second part adapted to be non-rotatably coupled to the input shaft of the transmission and a release member arranged to contact said pressure plate and move in response to axial movement of said pressure plate, said release member of said sub-clutch being operable to at least partially disengage said second part which is adapted to be coupled to the input shaft of the transmission from said first part which is coupled to said mass portion when biasing by said pressure plate disengages said flywheel to release the crankshaft of the engine from the input shaft of the transmission; and an elastic portion operatively coupled to said mass portion and adapted to elastically couple the input shaft of the transmission and said mass portion together in a rotating direction when said sub-clutch operates the input shaft of the transmission and said mass portion in an interlocked manner, said mass portion and said first part of said sub-clutch being coupled to a bearing which is adapted to be coupled to the crankshaft of the engine to rotatably support said mass portion and said first part of sub-clutch on the crankshaft of the engine.

19. A coupling mechanism for coupling a crankshaft of an engine and an input shaft of a transmission, comprising:

a flywheel assembly having a flywheel non-rotatably coupled to the crankshaft of the engine;

a clutch disk assembly adapted to be coupled to the input shaft of the transmission;

a clutch cover assembly having an axially movable pressure plate and being operable to bias said pressure plate toward said flywheel to hold said clutch disk assembly between said flywheel and said pressure plate for frictional engagement between said flywheel assembly and said clutch disk assembly; and a dynamic damper assembly adapted to be coupled to the input shaft of the transmission, said dynamic damper including a mass portion adapted to rotate with the input shaft of the transmission;

a sub-clutch having a first part coupled to said mass portion, a second part adapted to be non-rotatably coupled to the input shaft of the transmission and a release member arranged to contact said pressure plate and move in response to axial movement of said pressure plate said release member of said sub-clutch being operable to at least partially disengage said second part which is adapted to be coupled to the input shaft of the transmission from said first part which is coupled to said mass portion when biasing by said pressure plate disengages said flywheel to release the crankshaft of the engine from the input shaft of the transmission; and an elastic portion operatively coupled to said mass portion and adapted to elastically couple the input shaft of the transmission and said mass portion together in a rotating direction when said sub-clutch operates the input shaft of the transmission and said mass portion in an interlocked manner, said sub-clutch further including a coupling member disposed between said first part and said second part, said coupling member is coupled to said release member to move therewith.

20. The coupling mechanism according to claim 19, wherein said first part of said sub-clutch includes a sub-clutch housing and said second part of said sub-clutch includes a friction plate biased by a biasing member to be operatively coupled with a portion of said sub-clutch housing by a biasing member.

* * * * *